United States Patent [19]

Banks

[11] Patent Number: 4,541,699
[45] Date of Patent: Sep. 17, 1985

[54] METHOD OF MANUFACTURING A CAMERA TUBE FACEPLATE

[75] Inventor: Peter B. Banks, Wickford, England

[73] Assignee: English Electric Valve Company Limited, Chelmsford, England

[21] Appl. No.: 550,027

[22] Filed: Nov. 8, 1983

[30] Foreign Application Priority Data

Nov. 12, 1982 [GB] United Kingdom ............... 8232387

[51] Int. Cl.⁴ .............................................. G03B 9/56
[52] U.S. Cl. ................................ 354/227.1; 65/59.32; 65/59.7; 65/56; 65/58
[58] Field of Search ................... 65/59.23, 59.28, 59.3, 65/59.32, 59.7, 37, 38, 39, 50, 56, 58; 354/227.1

[56] References Cited

U.S. PATENT DOCUMENTS

| | | | |
|---|---|---|---|
| 1,838,781 | 12/1931 | Moulton et al. | 65/37 X |
| 3,252,318 | 5/1966 | Rosen | 354/227.1 X |
| 3,420,006 | 1/1969 | Barnett | 65/61 |
| 3,445,211 | 5/1969 | Kerstetter | 65/56 |
| 3,480,421 | 11/1969 | Allen | 65/59.32 X |
| 3,714,706 | 2/1973 | Reizman et al. | 65/59.3 X |

Primary Examiner—Robert Lindsay
Attorney, Agent, or Firm—Spencer & Frank

[57] ABSTRACT

It is desirable to have a camera tube in which the signal plate has a low capacity. This may be achieved by taking a conductor from the signal plate through the glass faceplate. Previous methods of manufacturing a faceplate in which a conductor is embedded have proved unsatisfactory because of difficulty in carrying them out, and distortion and incomplete fusion of glass.

A graphite mould having a base and walls contains and supports two glass blocks and a conductor and permits a degree of fluidity of the glass to be obtained which gives good fusion.

9 Claims, 5 Drawing Figures

METHOD OF MANUFACTURING A CAMERA TUBE FACEPLATE

BACKGROUND OF THE INVENTION

This invention relates to a method of manufacturing a camera tube faceplate and more particularly to one in which a conductor is incorporated in the faceplate.

Camera tubes generally have a glass faceplate on which is deposited an electrically conducting transparent layer called the signal plate. A photosensitive layer is deposited on the signal plate and forms what is known as the target. In operation a current passes into the signal plate having a value which is dependent on the level of illumination of part of an object being scanned at that time. This current is conventionally conducted out through the outside edge of the signal plate.

It is desirable that the electrical capacity of the signal plate be low to give increased sensitivity. This may be achieved by reducing the area of the signal plate and, instead of taking the current from the edge of the signal plate, by transmitting the current along a conductor located as close as possible to the screen without it encroaching on the image area. However, previous methods of embedding a conductor in the glass faceplate to give this advantage have proved unsatisfactory, being difficult to carry out, introducing distortions and giving incomplete fusion of glass at joints between different sections and at the conductor.

SUMMARY OF THE INVENTION

It is an object of the invention to provide an improved method of manufacturing a camera tube faceplate in which a conductor is embedded.

According to one aspect of the invention there is provided a method of manufacturing a camera tube glass faceplate in which an electrical conductor is embedded including: arranging a first glass member and a second glass member in a mould with a conductor located between them; and fusing the members together in the mould.

By employing the invention the degree of fluidity of the glass required for good fusion may be obtained, since the mould contains the glass and supports it during the process.

According to a second aspect of the invention there is provided a method of making camera tube faceplates comprising: positioning an elongate electrical conductor between two flat surfaces of respective glass members; fusing the glass so as to unite the glass members and to form a glass block in which the electrical conductor is embedded; and slicing the block transversely with respect to the electrical conductor.

BRIEF DESCRIPTION OF THE DRAWING

The invention is further described by way of example with reference to the accompanying drawing in which.

DETAILED DESCRIPTION OF THE DRAWING

Figure 1:
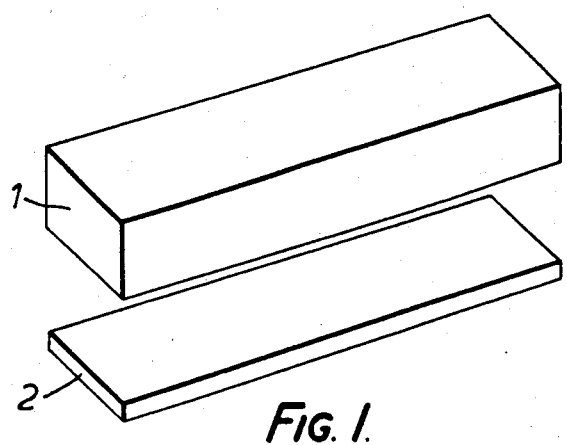
FIGS. 1 to 5 illustrate stages in the manufacture of camera tube faceplates in accordance with the invention, with similar references used for similar parts.

First and second blocks of glass 1 and 2 respectively, as shown in FIG. 1, have a length of 120 mm and a width of 19 mm. The first block has a greater depth than the other and their facing sides are polished.

Figure 2:
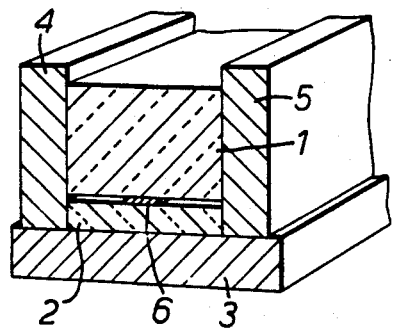

A graphite mould comprises a base 3, two upstanding walls 4 and 5 which are spaced apart by the width of the glass blocks 1 and 2 and end pieces (not shown) spaced apart by the lengths of the blocks 1 and 2. The second block 2 is placed on the base 3 and between the walls 4 and 5. A platinum ribbon conductor 6, having the same length as the blocks 1 and 2, is positioned on the upper surface of the second block 2 parallel to its long axis. The first block 1 is then arranged on top of this, as shown in transverse section in FIG. 2.

Figure 3:
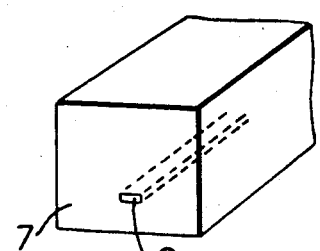

The mould and its contents are placed in a nitrogen atmosphere and heated to a temperature of about 800° to 900° C. The glass fuses and is then annealed and cooled. The process results in a final block 7 of glass (FIG. 3) having the conductor 6 embedded in it.

Figure 4:
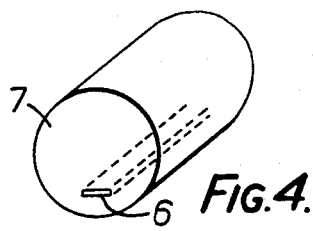
Figure 5:
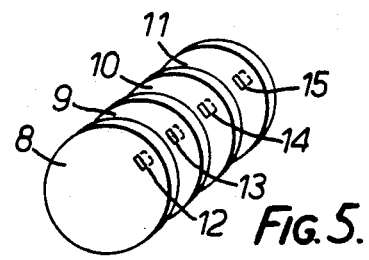

The final block 7 is ground into a cylindrical block (FIG. 4) and is then sliced to provide a number of glass discs, four of which 8, 9, 10 and 11 are shown in FIG. 5. Each of the discs 8, 9, 10 and 11 has a conductor 12, 13, 14 and 15 respectively embedded in it. The discs are then ground to the desired thickness and their faces polished. A layer of tin oxide is deposited on one of the faces of each disc to form the signal plate and a layer of lead oxide deposited on each signal plate to provide the target, thus giving suitable camera tube faceplates.

I claim:

1. A method of manufacturing a camera tube glass faceplate in which an electrical conductor is embedded including: arranging a first glass member and a second glass member in a mould with a conductor located between them, fusing the members together in the mould, slicing a block formed by fusing together of the glass members to form a plurality of slices, and depositing on each slice a signal plate and a target to form a camera tube faceplate.

2. A method as claimed in claim 1 and wherein facing sides of the first and second glass members between which the conductor is located are substantially flat.

3. A method as claimed in claim 2 and wherein the glass members are rectangular in cross-section transverse to the flat sides and wherein the glass members are fused together in a parallelepiped shaped mould cavity.

4. A method as claimed in claim 3 and wherein a block formed by the fusing together of the glass members is ground to a cylindrical shape.

5. A method as claimed in claim 1 and wherein the mould is graphite.

6. A method of making camera tube faceplates comprising: positioning an elongate electrical conductor between two flat surfaces of respective glass members; fusing the glass in a mold so as to unite the glass members and to form a glass block in which the electrical conductor is embedded; slicing the block transversely with respect to the electrical conductor; and depositing on each slice a signal plate and a target to form a camera tube faceplate.

7. A method according to claim 6 including a step of grinding the glass block into a cylindrical shape the axis of which is parallel to the direction of the electrical conductor.

8. A camera tube faceplate manufactured by a method as claimed in claim 1.

9. A camera tube faceplate manufactured by a method as claimed in claim 6.